US009303719B2

(12) United States Patent
Gürses

(10) Patent No.: US 9,303,719 B2
(45) Date of Patent: Apr. 5, 2016

(54) POWERTRAIN MECHANISM FOR VEHICLES WITH INTERNAL COMBUSTION ENGINE

(71) Applicant: VALEO OTOMOTIV SISTEMLERI ENDÜSTRISI A.Ş., Osmangazi / BURSA PK (TR)

(72) Inventor: Serkan Gürses, Osmangazi / Bursa PK (TR)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/286,435

(22) Filed: May 23, 2014

(65) Prior Publication Data

US 2014/0360312 A1    Dec. 11, 2014

(30) Foreign Application Priority Data

Jun. 11, 2013 (TR) .................. a 2013 07001

(51) Int. Cl.
*F16F 15/12* (2006.01)
*F16F 15/121* (2006.01)

(52) U.S. Cl.
CPC ......... *F16F 15/1217* (2013.01); *Y10T 74/2131* (2015.01)

(58) Field of Classification Search
CPC .............. F16F 15/1414; F16F 15/1421; F16F 15/1428; F16F 15/20; F16F 15/30; F16F 15/31; F16F 15/22; F16F 15/167; F16F 15/1217
USPC ........................................................ 74/574.4
See application file for complete search history.

(56) References Cited

U.S. PATENT DOCUMENTS

| | | | | |
|---|---|---|---|---|
| 4,351,167 A * | 9/1982 | Hanke et al. | ..................... | 464/24 |
| 4,905,539 A * | 3/1990 | Naudin et al. | ................ | 464/68.3 |
| 5,052,978 A * | 10/1991 | Hanke | .............................. | 464/24 |
| 5,088,964 A * | 2/1992 | Kuhne | .......................... | 464/68.3 |
| 5,367,921 A * | 11/1994 | Fukushima | ................... | 464/68.3 |
| 7,955,178 B2 * | 6/2011 | Mu et al. | .................... | 464/68.92 |
| 2010/0081510 A1 | 4/2010 | Reinhart et al. | | |

* cited by examiner

*Primary Examiner* — Vicky Johnson
(74) *Attorney, Agent, or Firm* — Berenato & White, LLC

(57) ABSTRACT

A powertrain mechanism comprising a carrier plate connected to the crankshaft, a drive plate connected to the gearbox shaft and at least one spring positioned between at least one first spring housing provided on the carrier plate and at least one spring housing provided on the drive plate, in order to transfer the torque, obtained from the crankshaft, to the gearbox shaft in vehicles having internal combustion engine.

20 Claims, 6 Drawing Sheets

POWERTRAIN MECHANISM FOR VEHICLES WITH INTERNAL COMBUSTION ENGINE

CROSS-REFERENCE TO RELATED APPLICATIONS AND CLAIM TO PRIORITY

This application claims priority to Turkish Patent Application No. 2013/07001 filed Jun. 11, 2013 of which the disclosures are incorporated herein by reference and to which priority is claimed.

FIELD OF INVENTION

The present invention relates to a powertrain mechanism positioned between the crankshaft and gearbox shaft, in order to be used in vehicles with internal combustion engine.

BACKGROUND OF THE INVENTION

In vehicles with internal combustion engine, powertrain mechanisms are utilized between the crankshaft and the gearbox shaft for transmitting the power, obtained in the engine, to the wheels. Said powertrain mechanisms are designed so as to transmit power and so as to damp the vibrations occurring.

Said power transmission units are connected to a flywheel. Moreover, engine torque is applied to the plates provided on the gearbox shaft side and plate provided on the flywheel side during functioning of said power units, and thereby movement is transferred to the gearbox shaft through the drive plates provided in between. Meanwhile, first of all, the springs, positioned between said plates, are pressed by drive plate. Additionally said plates are connected by means of stop pins to each other. When drive plate contacts with stop pins, whole assembly rotates at same speed. In another embodiment seen in the application with reference number US20100081510, after the drive plate compress the springs at a certain amount, it rests to the recesses provided on one of the other plates.

In all of said embodiments, the flywheel is provided as a piece separate from the powertrain mechanism. On the other hand, in alternative embodiments, there are inertia plates, connected to the outer side of the powertrain mechanism instead of the flywheel. In this case, the dimensions of the powertrain mechanism are increased.

As a result, because of all of the above mentioned problems, an improvement is required in the related technical field.

SUMMARY OF THE INVENTION

The present invention relates to a powertrain mechanism for use in vehicles with internal combustion engine, for eliminating the above mentioned disadvantages and for bringing new advantages to the related technical field.

The main object of the present invention is to provide a compact structure where the inertia plate and the powertrain mechanism are joined.

Another object of the present invention is to provide a powertrain mechanism used for preventing over-compression of springs during power transmitting and which does not need usage of stop pins whereon the drive plate is rested.

In order to realize all of the above mentioned objects and the objects which are to be deducted from the detailed description below, the present invention is a powertrain mechanism comprising a carrier plate connected to the crankshaft, a drive plate connected to the gearbox shaft and at least one spring positioned between at least one first spring housing provided on the carrier plate and at least one spring housing provided on the drive plate, in order to transfer the torque, obtained from the crankshaft, to the gearbox shaft in vehicles having internal combustion engine. Accordingly, the present invention is characterized by comprising at least one inertia plate having an internal opening and connected to the side of the carrier plate where the drive plate is provided, and at least one recess provided on the inner wall of said inertia plate and correspondingly, at least one drive tab provided on the outer wall of the drive plate and further characterized in that during transfer of the rotational movement of the carrier plate to the drive plate, said drive tab realizes rotational movement in the recess and the drive tab halts at the stop point inside the recess at the end of predetermined amount of compression of the springs provided between the drive plate and the carrier plate. Thus, further compression of the springs is prevented and torque transfer is provided directly from the inertia plate to the drive plate.

In a preferred embodiment of the subject matter invention, the drive tab width of the portion of the drive tab entering into the recess is smaller than the recess width provided on the inertia plate. Thus, the drive tab is movable inside the recess at predetermined amounts.

In another preferred embodiment of the subject matter invention, the outer diameter of the drive plate is smaller than the inner diameter of the inertia plate and the drive plate is provided inside the inertia plate. Thus, the drive plate is positioned inside the gap provided inside the inertia plate and the powertrain mechanism is provided to have a smaller volume.

In another preferred embodiment of the subject matter invention, at least one connection end is provided inside at least one connection end opening provided at the center of the drive plate.

In another preferred embodiment of the subject matter invention, at least one first connection opening is provided for providing the connection of the carrier plate to the crankshaft.

In another preferred embodiment of the subject matter invention, the drive plate comprises at least one bolt passage opening which is greater than the first connection opening in a concentric manner with said first connection opening.

In another preferred embodiment of the subject matter invention, in order to provide connection of the carrier plate to the inertia plate, at least one first assembly opening is provided on the carrier plate and at least one fifth assembly opening is provided on the inertia plate correspondingly.

In another preferred embodiment of the subject matter invention, there is at least one fixation plate connected to the face of the inertia plate facing the gearbox shaft.

In another preferred embodiment of the subject matter invention, in order to provide the connection of said fixation plate to the inertia plate, at least one fourth assembly opening is provided in a corresponding manner with said fifth assembly opening.

In another preferred embodiment of the subject matter invention, there is at least one connection element for connecting the carrier plate, inertia plate and the fixation plate.

In another preferred embodiment of the subject matter invention, the fixation plate comprises at least one second spring housing corresponding to at least one second spring housing provided on the drive plate.

DETAILED DESCRIPTION OF THE PREFERRED EMBODIMENT(S)

In this detailed description, a powertrain mechanism (1) for providing power transmission between the crankshaft and gearbox shaft for automatic hybrid vehicles is explained with references to examples without forming any restrictive effect in order to make the subject more understandable.

Figure 1:
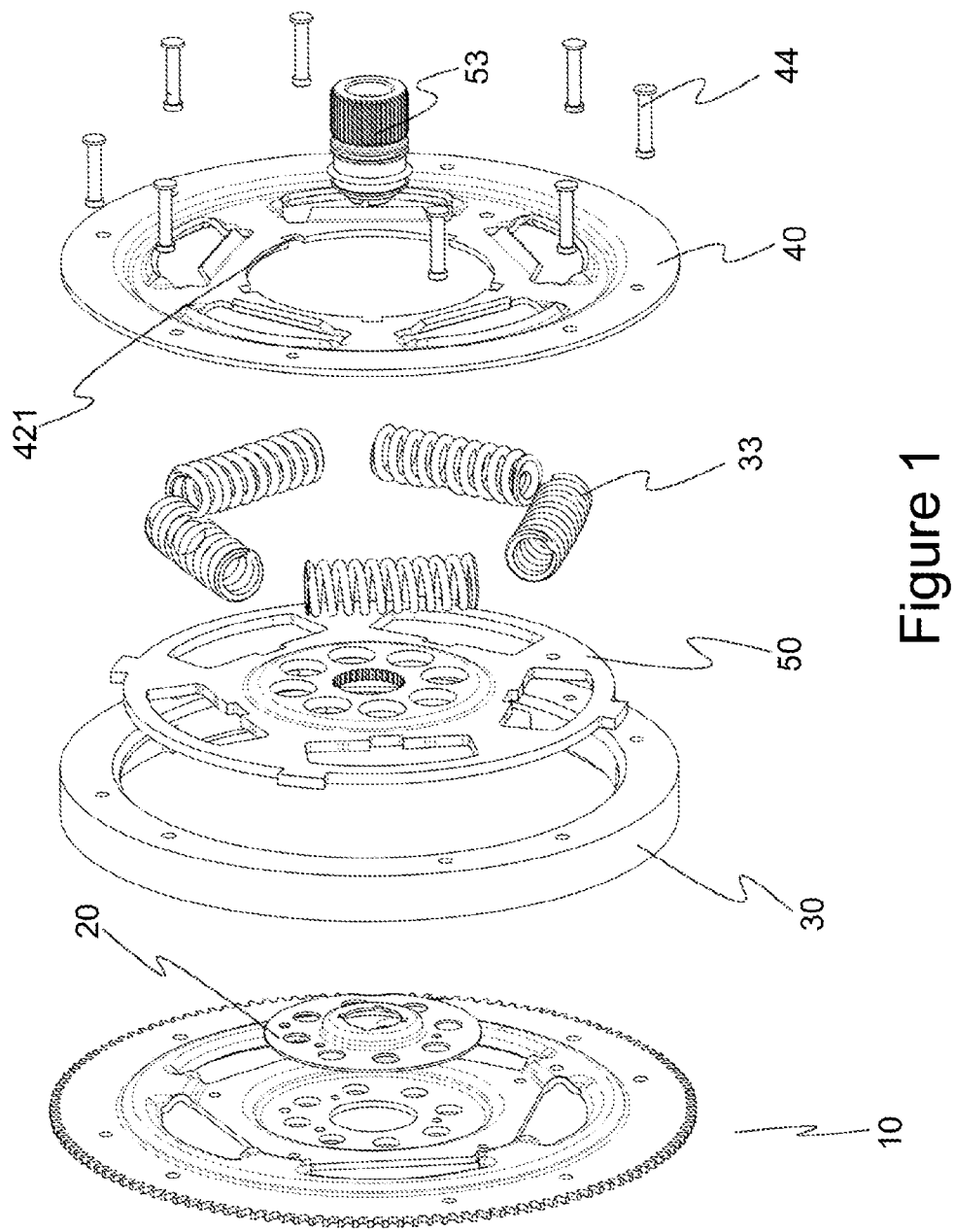
FIG. 1 is a representative exploded view of the subject matter powertrain mechanism.
Figure 5:
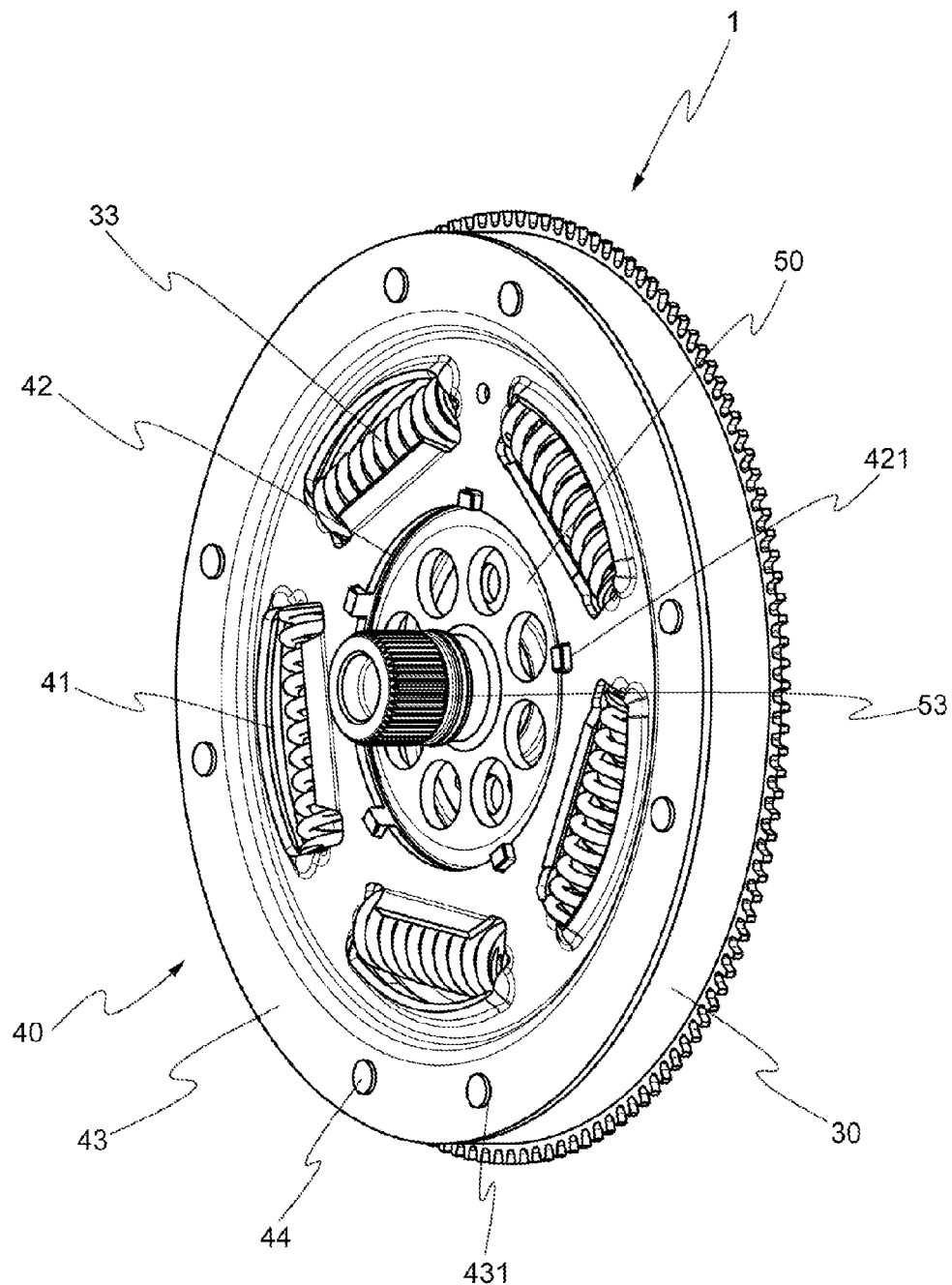
FIG. 5 is a representative isometric view of the subject matter powertrain mechanism.

As can be seen in FIG. 1 and FIG. 5, the subject matter powertrain mechanism (1) comprises at least one carrier plate (10) facing the engine side, at least one fixation plate (40) facing the gearbox side, at least one inertia plate (30) positioned between said carrier plate (10) and said fixation plate (40) and pluralities of springs (33) for providing connection to the crankshaft.

Figure 4:
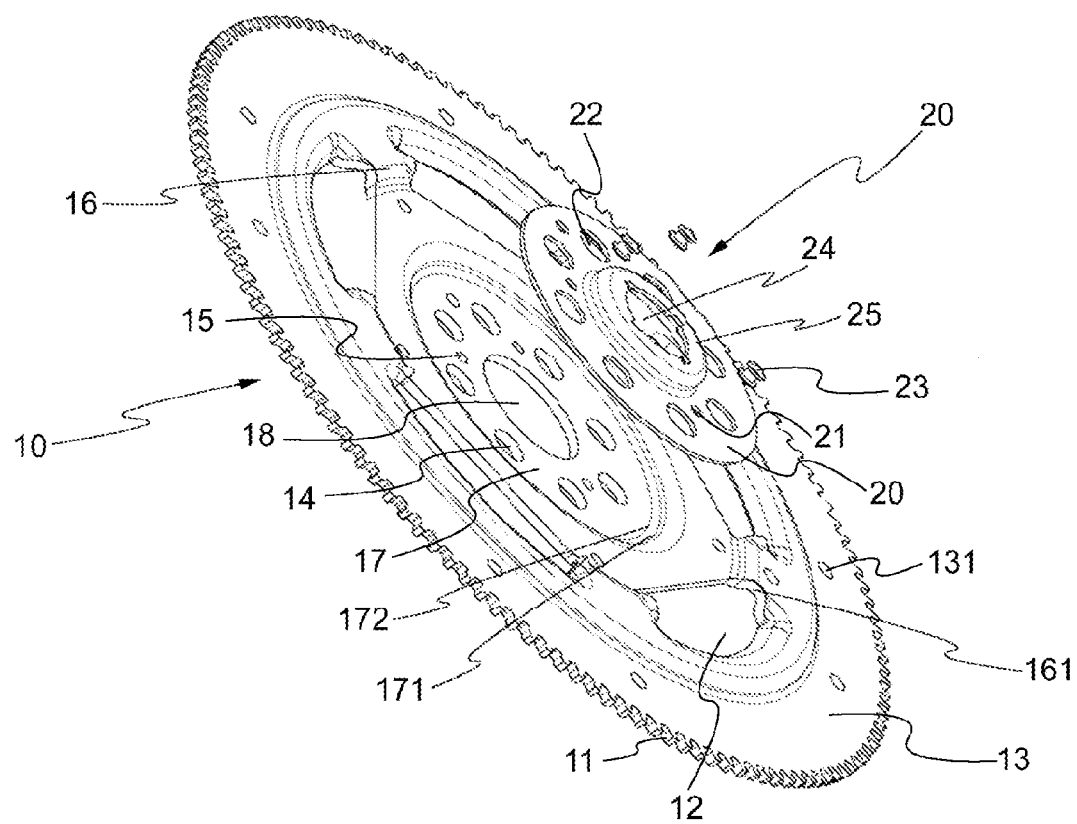
FIG. 4 is a representative view of the carrier plate and the support plate of the subject matter powertrain mechanism.

As can be seen in FIG. 4, the carrier plate (10) is provided in circular form. There is at least one first hub opening (18) provided in a circular hole form at the center of the carrier plate (10). Around said first hub opening (18), there are pluralities of first connection openings (14) provided in pluralities of holes form arranged at certain intervals on a circular axis and used for providing connection with the crankshaft. Moreover, during the connection of the crankshaft and the carrier plate (10), the end of the crankshaft is disposed inside of the first hub opening (18). An internal hub (17) is defined between the first hub opening (18) and a step (171) provided on the side of said first connection openings (14) facing the outer wall of the carrier plate (10). There are teeth (11) provided along the outer wall of the carrier plate (10). There is a first seating surface (13) provided in flat form with respect to the center from the wall where the teeth (11) are provided. There are pluralities of first assembly openings (131) arranged at certain intervals on a circular axis on said first seating surface (13). There are pluralities of first spring housings (12) arranged at certain intervals between the first seating surface (13) and the step (171). Said first spring housings (12) are provided in the form of openings wherein the springs (33) are disposed. There are support regions (16) at the parts remaining between the first spring housings (12). Said support regions (16) have convoluted portions (161) provided so as to form an emboss form towards the gearbox side. Springs (33) are positioned between said support regions (16) and said convoluted portions (161) provide the spring (33) to be housed preventing removal from the place thereof.

The support plate (20) provided inside the powertrain mechanism (1) is essentially provided in a circular form having a size equal to the internal hub (17) portion of the carrier plate (10). There is a second hub opening (24) at the center of said support plate (20). Said second hub opening (24) is provided at the center of the support plate (20). There are second connection openings (22) between said second hub opening (24) and the outer wall of the support plate (20). Said second connection openings (22) are positioned so as to match with the first connection openings (14) provided at the internal hub (17) of the carrier plate (10).

As can be seen in FIG. 5, the fixation plate (40) is provided in a form similar to the form of the carrier plate (10). There are pluralities of fourth assembly openings (431) on the second seating surface (43) provided at the vicinity of the outer wall of the fixation plate (40). Said fourth assembly openings (431) match with the first assembly openings (131) provided on the carrier plate (10). Moreover, there is a third hub opening (42) provided at the center of the fixation plate (40). There are pluralities of second spring housings (41) between the third hub opening (42) and the second seating surface (43). Said second spring housings (41) are provided at equal size and form so as to be compliant to the first spring housings (12) provided on the carrier plate (10).

Figure 2A:
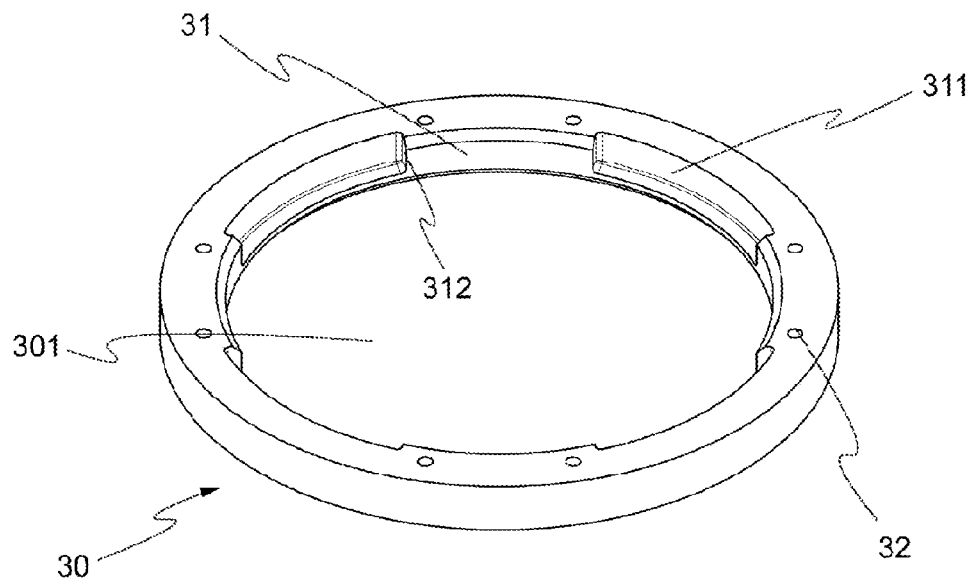
FIG. 2a and FIG. 2b are the representative views of the inertia plate belonging to the subject matter powertrain mechanism.
Figure 2B:
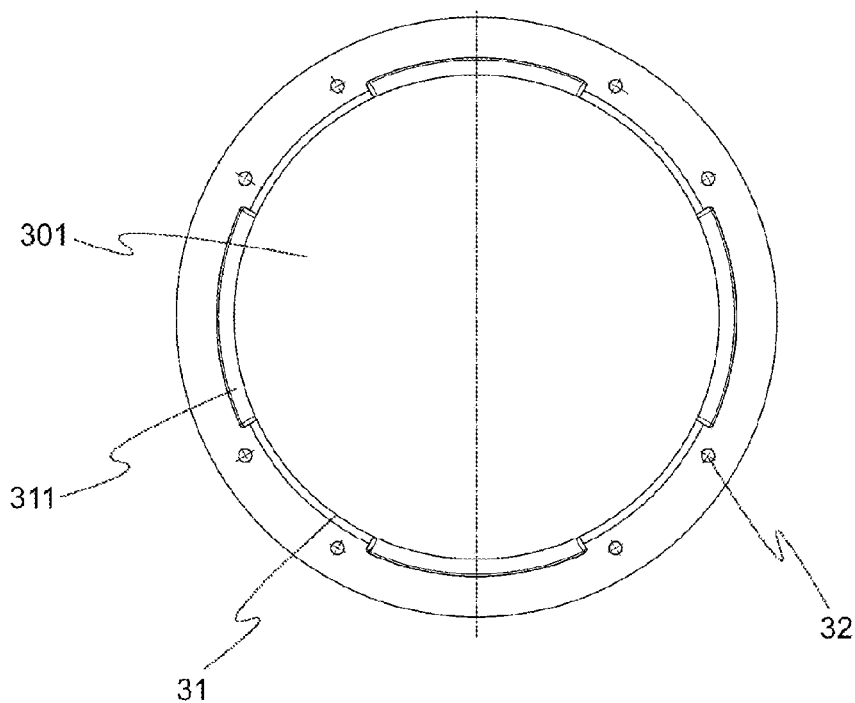

As can be seen in FIG. 2a and FIG. 2b, the inertia plate (30), provided inside the powertrain mechanism (1), is in the form of a circular frame and has an internal central opening (301) through the inertia plate (30). The internal central opening (301) is defined by a substantially cylindrical inner wall (31) of the inertia plate (30). On the inner wall (31) of the inertia plate (30), pluralities of recesses (311) are provided such that there are certain distances in between. The recesses (311) are provided in the form of recesses formed at the intersection of the inner wall (31) and of one face of the inertia plate (30). Thus, the side of the recesses (311) facing the lateral face of the inertia plate (30) is provided to remain open. Together with this, the recesses (311) are provided in arc form. Moreover, in order to provide non-rotatable connection of the inertia plate (30) to the carrier plate (10) and to the fixation plate (40), there are pluralities of fifth assembly openings (32) extending between the two faces of the inertia plate (30) in a compliant manner with respect to the first assembly opening (131) and the fourth assembly opening (431).

Figure 3:
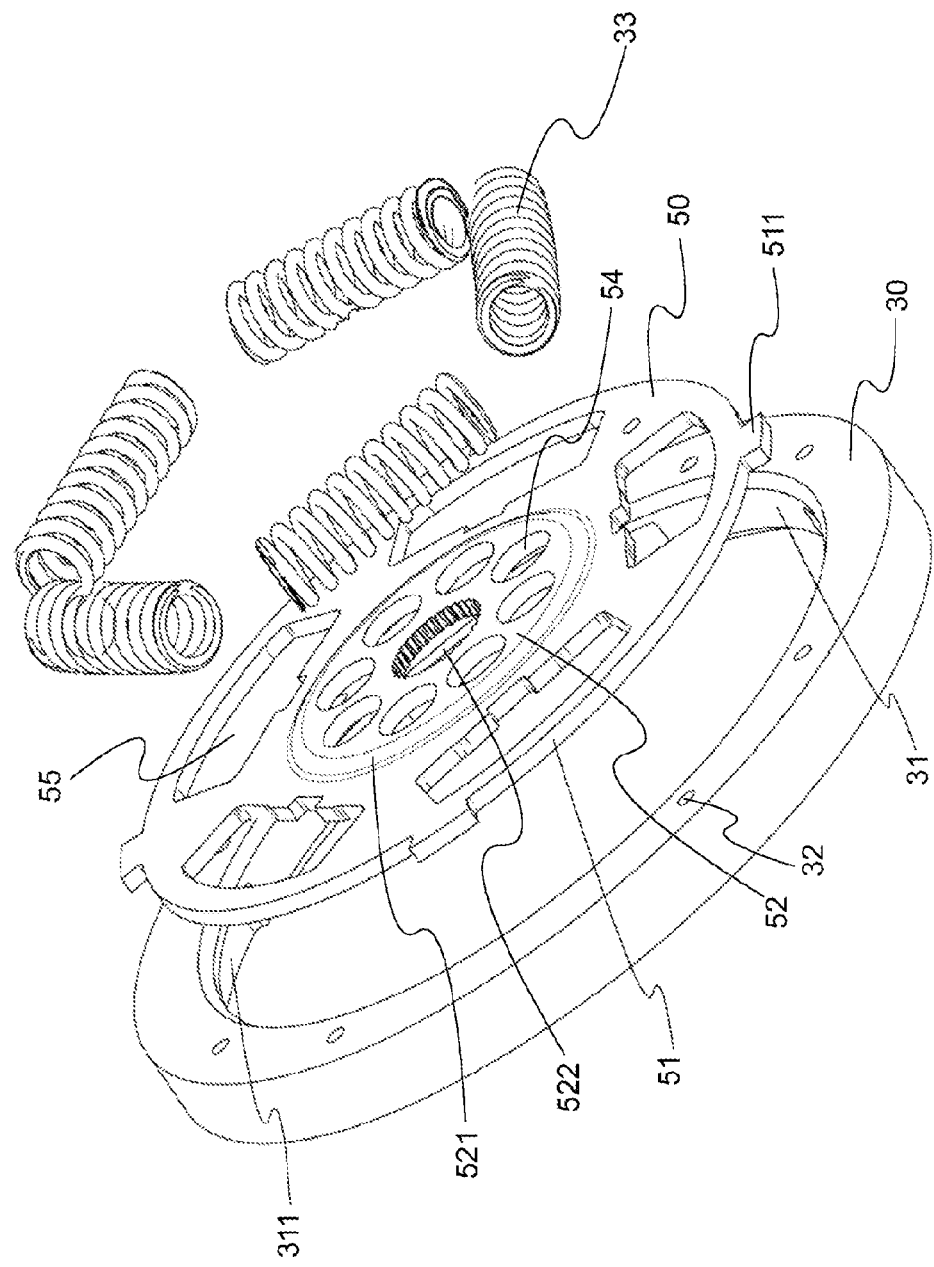
FIG. 3 is a representative view of the inertia plate and of the drive plate of the subject matter powertrain mechanism.
Figure 6A:
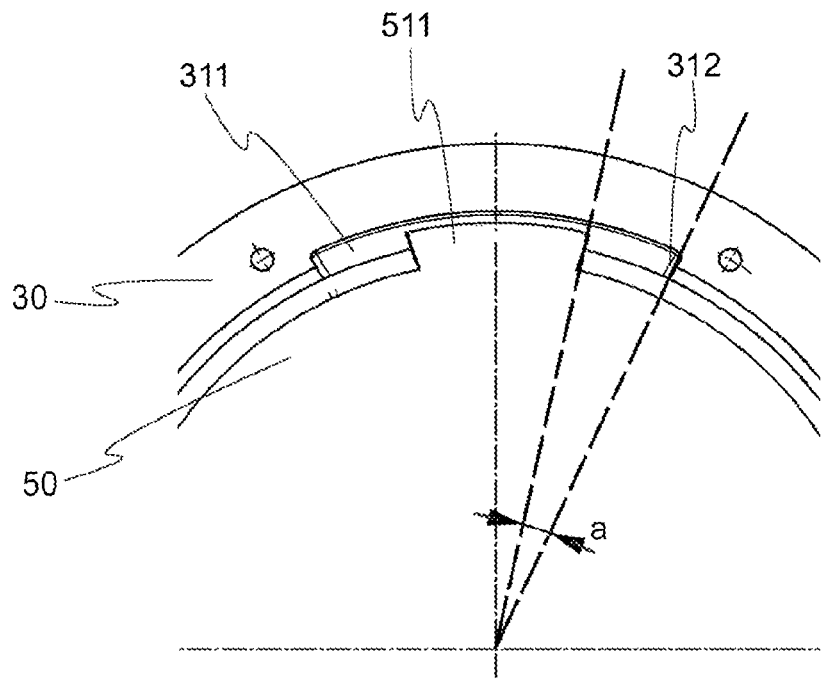
FIG. 6a and FIG. 6b are the representative detailed views of the inertia plate and of the drive plate of the subject matter powertrain mechanism.
Figure 6B:
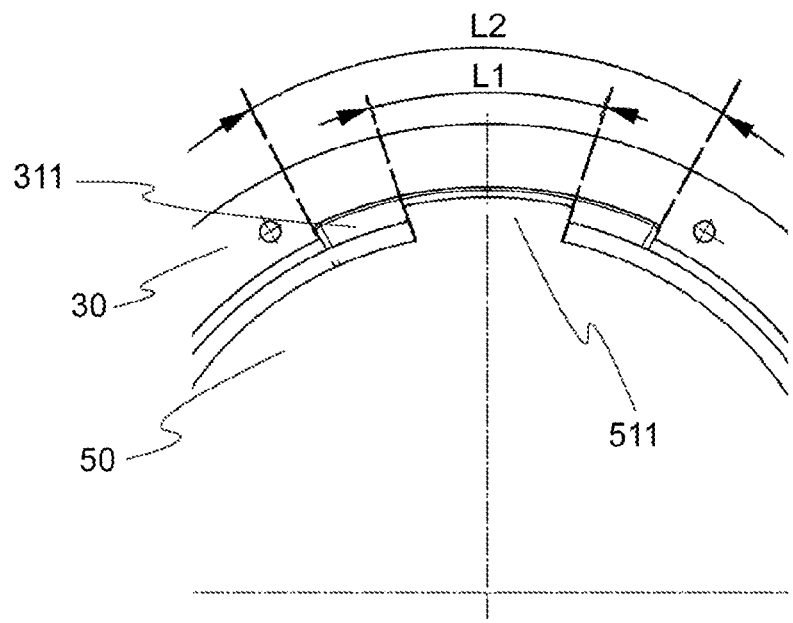

As can be seen in FIG. 3, the powertrain mechanism (1) comprises a drive plate (50) for transferring the movement, received from the crankshaft, to the gearbox shaft. The drive plate (50) is provided in the form of a circular plate having a size providing placement of the outer wall (51) into the inner wall (31) of the inertia plate (30). Specifically, as best shown in FIGS. 6a and 6b, an outer diameter of the drive plate (50) is smaller than an inner diameter of the inertia plate (30) so that the drive plate (50) is positioned inside the substantially cylindrical inner wall (31) of the inertia plate (30) with a gap between an outer wall of the drive plate (50) and the inner wall (31) of the inertia plate (30). Moreover, there is at least one drive tab (511) provided so as to extend outwardly from the outer wall (51) of the drive plate (50). In the preferred application of the present invention, the number of the drive tabs (511) provided is equal to the number of recesses (311) provided on the inertia plate (30). As can be seen in FIG. 6b, the drive tab width (L1) are embodied so as to be smaller than the Recess width (L2). Thus, when the drive tabs (511) are positioned inside the recesses (311), the drive plate (50) and the inertia plate (30) are provided to rotate independently of each other. At the center of the drive plate (50), there is a connection end opening (522) wherein a connection end (53) will be positioned for providing connection to the gearbox shaft. There is a hub (52) provided in emboss form in the middle portion of the face of the drive plate (50) facing the fixation plate (40). The hub (52) is provided in circular form. There are pluralities of bolt passage openings (54) arranged on a circular axis around the connection end opening (522) on the hub (52). The bolt passage gaps (54) are provided in a concentric manner with the first connection openings (14). Moreover, the diameters of the bolt passage openings (54) are embodied in a greater manner than the first connection openings (14) so as to provide passage of the bolts there through in an easier manner and so as to provide passage of the fixtures used while bolt assembly is realized when required. There are spring housings (55) positioned at certain intervals between the outer wall (51) of the drive plate (50) and the hub wall (521) formed around the outer periphery of the hub (52). The spring housings (55) are provided in a corresponding manner with the first spring housings (12) provided on the carrier plate (10) and the second spring housings (41) provided on the fixation plate (40).

The second assembly opening (15) provided in the internal hub (17) of the carrier plate (10) and the third assembly opening (21) provided on the support plate (20) are used for connecting the carrier plate (10) to the support plate (20). The second assembly openings (15) of the carrier plate (10) and the third assembly openings (21) of the support plate (20) are kept in a concentric manner and afterwards, the pieces are fixed to each other by means of the assembly elements (23). Moreover, meanwhile, the support plate (20) seats to the step inner wall (172) of the step (171). By means of said fixation process, the carrier plate (10) and the support plate (20) are movable as a whole. In the preferred application of the present invention, rivet is used as the assembly element (23). Moreover, carrier plate (10) and support plate (20) are assembled through second assembly opening (15) and third assembly opening (21) with assembly elements (23) particularly by means of rivets. The steps (not illustrated in the figures) formed in the second assembly opening (15) and in the third assembly opening (21), prevent formation of any tab on the surfaces of carrier plate (10) and of the support plate (20) due to use of assembly element (23) particularly by means of a rivet.

During the assembly of the powertrain mechanism (1), first of all, the support plate (20) is fixed to the carrier plate (10). Afterwards, the springs (33) are disposed inside of the first spring housings (12). At the continuation thereof, when the drive plate (50) is seated onto the carrier plate (10), the springs (33) are disposed into the spring housings (55) provided on the drive plate (50). At the continuation thereof, the inertia plate (30) is disposed onto the first seating surface (13). Meanwhile, the drive tabs (511) of the drive plate (50) are disposed into the recesses (311) provided on the inertia plate (30). The fixation plate (40) is disposed on the inertia plate (30) such that the springs (33) are disposed to the second spring housings (41). Finally, after the fourth assembly openings (431), provided on the fixation plate (40), are positioned so as to be at the same direction as the first assembly openings (131) provided on the carrier plate (10), fixation process is realized by means of the connection elements (44) passed through the fourth assembly openings (431), through the fifth assembly openings (32) provided on the inertia plate (30) and through the first assembly openings (131). Depending on this connection type, the inertia plate (30) is fixed by being positioned between the carrier plate (10) and the fixation plate (40). In the preferred application of the present invention, rivet is used as connection element (44). Together with this, the assembly of the crankshaft and of the powertrain mechanism (1) is realized by using connection elements passed through the first connection opening (14) provided on the internal hub (17) and correspondingly through the second connection opening (22) provided on the support plate (20).

In the light of all of the described details, the operation of the subject matter powertrain mechanism (1) is as follows. The carrier plate (10) connected to the crankshaft transfers the movement received from the crankshaft to the inertia plate (30) and to the fixation plate (40) through the connection elements (44). As a result of the rotation movement, the carrier plate (10), the fixation plate (40) and the inertia plate (30) try to rotate, and the drive plate (50), connected to the gearbox shaft from the connection end (53), try to remain fixed. Meanwhile, while the fixation plate (40) and the carrier plate (10) are rotating, since the drive plate (50) tries to remain fixed, the springs (33), fixed between said plates, begin compressing. As a result of compressing of the springs (33), the drive plate (50) begins rotating. In other words, the springs (33) transfer the movement, received from the carrier plate (10) and from the fixation plate (40), to the drive plate (50). Thus, the movement is transferred to the gearbox shaft. During movement transfer, the springs (33) are compressed and the inertia plate (30) and the drive plate (50) rotate at different angular velocities. Meanwhile, because of said angular velocity difference, the drive tabs (511), provided on the outer wall (51) of the drive plate (50), move in the recesses (311) provided inside the inertia plate (30). As the springs (33) are compressed, difference of angular velocity between drive plate (50) and inertia plate (30) gradually decreases. When the movement amount difference between the inertia plate (30) and the drive plate (50) reaches the predetermined deviation angle (a) (seen in FIG. 6a), the drive tabs (511) stop at the stop point (312) provided at the end of the recess (311). In other words, during the relative movement between the carrier plate (10) and the drive plate (50), the drive tabs (511) move inside the recesses (311) and at the end of the rotation, the drive tabs halt at stop point (312). When the drive tabs (511) stop at the end of the recess (311), the inertia plate (30) and the drive plate (50) begin moving together. In other words, when the compression amount in the springs (33) reaches a predetermined level, the torque applied to the holder plate (10) is transferred to the drive plate (50) by means of the inertia plate (30).

By means of this embodiment, the inertia plate (30) is integrated into the powertrain mechanism (1). Thus, a compact structure is provided. In other words, the inertia plate (30) is positioned into the gap present between the carrier plate (10) and the fixation plate (40) in the prior art. Thus, a powertrain mechanism (1) realizes the functions of the inertia plate (30) although having dimensions similar to the dimensions in the prior art. On the other hand, said embodiment eliminates usage of the stop pins that fasten carrier plate (10) and the fixation plate (40).

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:
1. A powertrain mechanism (1) comprising:
a carrier plate (10) adapted to be connected to a crankshaft of an internal combustion engine;
a drive plate (50) adapted to be connected to a gearbox shaft;
at least one spring (33) positioned between at least one first spring housing (12) provided on the carrier plate (10) and at least one spring housing (55) provided on the drive plate (50), in order to transfer the torque, obtained from the crankshaft, to the gearbox shaft; and
at least one inertia plate (30) having an internal central opening (301) through the inertia plate (30) defined by an inner wall (31) thereof, the at least one inertia plate (30) connected to a side of the carrier plate (10) facing the drive plate (50);

the inertia plate (30) having at least one recess (311) provided on the inner wall (31) of the inertia plate (30);

the drive plate (50) having at least one drive tab (511) provided on an outer wall (51) of the drive plate (50);

the drive tab (511) is rotationally moveable within in the recess (311); and the drive tab (511) halts at a stop point (312) inside the recess (311) at the end of predetermined amount of compression of the springs (33) provided between the drive plate (50) and the carrier plate (10).

2. The powertrain mechanism (1) according to claim 1, wherein the drive tab width (L1) of the portion of the drive tab (511) entering into the recess (311) is smaller than the recess width (L2) provided on the inertia plate (30).

3. The powertrain mechanism (1) according to claim 2, further comprising at least one fixation plate (40) connected to the inertia plate (30).

4. The powertrain mechanism (1) according to claim 3, wherein the inertia plate (30) is positioned between the carrier plate (10) and the fixation plate (40).

5. The powertrain mechanism (1) according to claim 1, wherein an outer diameter of the drive plate (50) is smaller than an inner diameter of the inertia plate (30); and wherein the drive plate (50) is provided inside the inertia plate (30).

6. The powertrain mechanism (1) according to claim 5, further comprising at least one fixation plate (40) connected to the inertia plate (30).

7. The powertrain mechanism (1) according to claim 6, wherein the inertia plate (30) is positioned between the carrier plate (10) and the fixation plate (40).

8. The powertrain mechanism (1) according to claim 1, wherein at least one connection end (53) is provided inside at least one connection end opening (522) provided at the center of the drive plate (50).

9. The powertrain mechanism (1) according to claim 8, further comprising at least one fixation plate (40) connected to the inertia plate (30).

10. The powertrain mechanism (1) according to claim 1, wherein at least one first connection opening (14) is provided for providing the connection of the carrier plate (10) to the crankshaft.

11. The powertrain mechanism (1) according to claim 10, further comprising at least one fixation plate (40) connected to the inertia plate (30).

12. The powertrain mechanism (1) according to claim 10, wherein the drive plate (50) comprises at least one bolt passage opening (54) which is greater than the first connection opening (14) in a concentric manner with the first connection opening (14).

13. The powertrain mechanism (1) according to claim 12, further comprising at least one fixation plate (40) connected to the inertia plate (30).

14. The powertrain mechanism (1) according to claim 1, wherein in order to provide connection of the carrier plate (10) to the inertia plate (30), at least one first assembly opening (131) is provided on the carrier plate (10) and at least one fifth assembly opening (32) is provided on the inertia plate (30) correspondingly.

15. The powertrain mechanism (1) according to claim 14, further comprising at least one fixation plate (40) connected to the inertia plate (30).

16. The powertrain mechanism (1) according to claim 1, further comprising at least one fixation plate (40) connected to the inertia plate (30).

17. The powertrain mechanism (1) according to claim 16, wherein in order to provide a connection of the fixation plate (40) to the inertia plate (30), at least one fifth assembly opening (32) is provided on the inertia plate (30) and at least one fourth assembly opening (431) is provided on the fixation plate (40) in a corresponding manner with the at least one fifth assembly opening (32).

18. The powertrain mechanism (1) according to claim 17, further comprising at least one connection element (44) for connecting the carrier plate (10), inertia plate (30) and the fixation plate (40).

19. The powertrain mechanism (1) according to claim 16, wherein the fixation plate (40) comprises at least one second spring housing (41) corresponding to at least one second spring housing (55) provided on the drive plate (50).

20. The powertrain mechanism (1) according to claim 16, wherein the inertia plate (30) is positioned between the carrier plate (10) and the fixation plate (40).

* * * * *